United States Patent
Namba (10) Patent No.: US 7,966,440 B2
(45) Date of Patent: Jun. 21, 2011

(54) IMAGE PROCESSING CONTROLLER AND IMAGE FORMING APPARATUS

(75) Inventor: Mutsumi Namba, Tokyo (JP)

(73) Assignee: Ricoh Company, Limted, Tokyo (JP)

( * ) Notice: Subject to any disclaimer, the term of this patent is extended or adjusted under 35 U.S.C. 154(b) by 242 days.

(21) Appl. No.: 12/149,644

(22) Filed: May 6, 2008

(65) Prior Publication Data

US 2008/0288690 A1    Nov. 20, 2008

(30) Foreign Application Priority Data

May 14, 2007   (JP) .................................. 2007-128060
Mar. 21, 2008   (JP) .................................. 2008-073912

(51) Int. Cl.
    *G06F 13/36*    (2006.01)
(52) U.S. Cl. ......................... 710/309; 710/313; 710/316
(58) Field of Classification Search ................. 710/8–11, 710/15–19, 306, 309, 315, 316, 242, 244, 710/119, 123
    See application file for complete search history.

(56) References Cited

U.S. PATENT DOCUMENTS

| 7,058,738 B2 * | 6/2006 | Stufflebeam, Jr. ............. 710/104 |
| 7,487,274 B2 * | 2/2009 | Mishra et al. ................... 710/62 |
| 7,487,284 B2 * | 2/2009 | Kapur et al. .................... 710/310 |
| 7,525,986 B2 * | 4/2009 | Lee et al. ........................ 370/462 |
| 2004/0019729 A1 * | 1/2004 | Kelley et al. .................... 710/306 |
| 2005/0248584 A1 * | 11/2005 | Takeo et al. .................... 345/603 |
| 2006/0101178 A1 * | 5/2006 | Zhong et al. ................... 710/112 |
| 2006/0114918 A1 * | 6/2006 | Ikeda et al. .................... 370/408 |
| 2006/0174047 A1 * | 8/2006 | Carty ............................ 710/305 |
| 2006/0239194 A1 * | 10/2006 | Chapell ......................... 370/235 |
| 2007/0067551 A1 * | 3/2007 | Ikeda et al. .................... 710/315 |
| 2007/0211746 A1 * | 9/2007 | Oshikiri et al. ............... 370/437 |
| 2008/0147901 A1 * | 6/2008 | Gloekler et al. ................ 710/11 |
| 2008/0170257 A1 * | 7/2008 | Fukuda ........................ 358/1.15 |
| 2008/0222330 A1 * | 9/2008 | Shima .......................... 710/106 |
| 2008/0228968 A1 * | 9/2008 | Aihara et al. ................... 710/66 |
| 2008/0276027 A1 * | 11/2008 | Hagita .......................... 710/263 |
| 2009/0144478 A1 * | 6/2009 | Locker .......................... 710/305 |
| 2009/0177807 A1 * | 7/2009 | Wong ............................. 710/18 |

FOREIGN PATENT DOCUMENTS

| JP | 2002-032324 | 1/2002 |
| JP | 2005-025527 | 1/2005 |
| JP | 3682442 | 5/2005 |

OTHER PUBLICATIONS

Abstract of JP 2003-309680 published Oct. 31, 2003.

* cited by examiner

Primary Examiner — Khanh Dang
(74) Attorney, Agent, or Firm — Harness, Dickey & Pierce

(57) ABSTRACT

An image processing controller performs transmission and processing of image data by connecting an engine and a CPU connected via a chipset. A first controller controls communication with the chipset via a first PCI-Express I/F. A second controller controls communication with the engine when it is connected via a second PCI-Express I/F. A third controller controls communication with the engine when it is connected via a PCI I/F. The first controller receives, on behalf of the engine, an access from the CPU to the engine and inhibits a reference by the CPU to a resource connected to the image processing controller.

12 Claims, 9 Drawing Sheets

| PCI-CONFIG ADDRESS | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 | |
| RESERVED | | | | BUS_NUM | | | | | | | | DEV_NUM | | | | | FN_NUM | | | REG_ADR | | | | | | | | | | FIXED | | |

| PCI-CONFIG DATA | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 | |
| DATA | | | | | | | | | | | | | | | | | | | | | | | | | | | | | | | | |

FIG. 5

OFFSET VALUE FROM
BASE ADDRESS

| | |
|---|---|
| +40h | BRIDGE READ CHANNEL |
| +30h | BRIDGE WRITE CHANNEL |
| +20h | IMAGE INPUT CHANNEL |
| +18h | IMAGE OUTPUT CHANNEL 4 |
| +10h | IMAGE OUTPUT CHANNEL 3 |
| +08h | IMAGE OUTPUT CHANNEL 2 |
| +00h | IMAGE OUTPUT CHANNEL 1 |

FIG. 6

OFFSET VALUE FROM
BASE ADDRESS

| | | |
|---|---|---|
| +20h | IMAGE INPUT CHANNEL | |
| +18h | IMAGE OUTPUT CHANNEL 4 | |
| +10h | IMAGE OUTPUT CHANNEL 3 | |
| +08h | IMAGE OUTPUT CHANNEL 2 | |
| +00h | IMAGE OUTPUT CHANNEL 1 | |
| | BASE ADDRESS 0 | BASE ADDRESS 1 |

IMAGE PROCESSING CONTROLLER AND IMAGE FORMING APPARATUS

CROSS-REFERENCE TO RELATED APPLICATIONS

The present application claims priority to and incorporates by reference the entire contents of Japanese priority documents 2007-128060 filed in Japan on May 14, 2007 and 2008-073912 filed in Japan on Mar. 21, 2008.

BACKGROUND OF THE INVENTION

1. Field of the Invention

The present invention relates to an image processing controller and an image forming apparatus.

2. Description of the Related Art

An image forming apparatus such as a printer and a copying machine generally includes a controller application-specific integrated circuit (ASIC) that is operative to connect an engine unit to a central processing unit (CPU) and performs image forming processing by the CPU. Specifically, the controller ASIC and the engine unit are connected to each other via a bus, such as a peripheral component interconnect (PCI) interface (I/F), and the controller ASIC is also connected to the CPU, so that processing such as printing processing and copying processing is performed under the control of the CPU. The CPU is generally connected to the controller ASIC with a chipset because what an interface a CPU employs is not disclosed. Therefore, the CPU is connected to the chipset with the PCI I/F.

A performance of the image forming apparatus depends on a data transmission speed of the PCI I/F. However, the performance of the PCI I/F run with the chipset is generally relatively low, degrading the performance of the image forming apparatus.

A PCI-EXPRESS I/F with a capability of performing data transmission at a transmission speed higher than that of the PCI I/F is increasingly in practical use. By employing the PCI-EXPRESS I/F, the performance of the image forming apparatus can be enhanced.

A conventional image forming apparatus in which the controller ASIC is connected to the engine unit with a PCI I/F, and the controller ASIC is connected to the CPU with a chipset is disclosed in Japanese Patent Application Laid-open No. 2003-309680.

For using the PCI-EXPRESS I/F, a PCI-EXPRESS root complex controller and a PCI-EXPRESS endpoint controller having the PCI-EXPRESS I/F need to be installed in the controller ASIC. However, if the controller ASIC is provided only with the controllers having the PCI-EXPRESS I/F without a PCI controller having a PCI I/F, an engine such as a scanner and a plotter employing the PCI I/F cannot be used with the controller ASIC. Thus, it is preferable to install both the PCI-EXPRESS I/F and the PCI I/F to enhance usability of the image forming apparatus. To provide the controller ASIC with both the PCI-EXPRESS I/F and the PCI I/F, it is necessary to control data transmission path in the controller ASIC; however, such a technology has not been known.

SUMMARY OF THE INVENTION

It is an object of the present invention to at least partially solve the problems in the conventional technology.

According to an aspect of the present invention, there is provided an image processing controller that performs transmission and processing of image data by connecting an engine including a scanner and a plotter and a central processing unit that is connected via a chipset. The image processing controller includes a first controller that controls communication with the chipset via a first PCI-Express interface; a second controller that controls communication with the engine when the engine is connected via a second PCI-Express interface; and a third controller that controls communication with the engine when the engine is connected via a PCI interface. The first controller receives, on behalf of the engine, an access from the central processing unit to the engine and inhibits a reference by the central processing unit to a resource connected to the image processing controller.

Furthermore, according to another aspect of the present invention, there is provided an image forming apparatus including an image processing controller that performs transmission and processing of image data by connecting an engine including a scanner and a plotter and a central processing unit that is connected via a chipset. The image processing controller includes a first controller that controls communication with the chipset via a first PCI-Express interface; a second controller that controls communication with the engine when the engine is connected via a second PCI-Express interface; and a third controller that controls communication with the engine when the engine is connected via a PCI interface. The first controller receives, on behalf of the engine, an access from the central processing unit to the engine and inhibits a reference by the central processing unit to a resource connected to the image processing controller.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
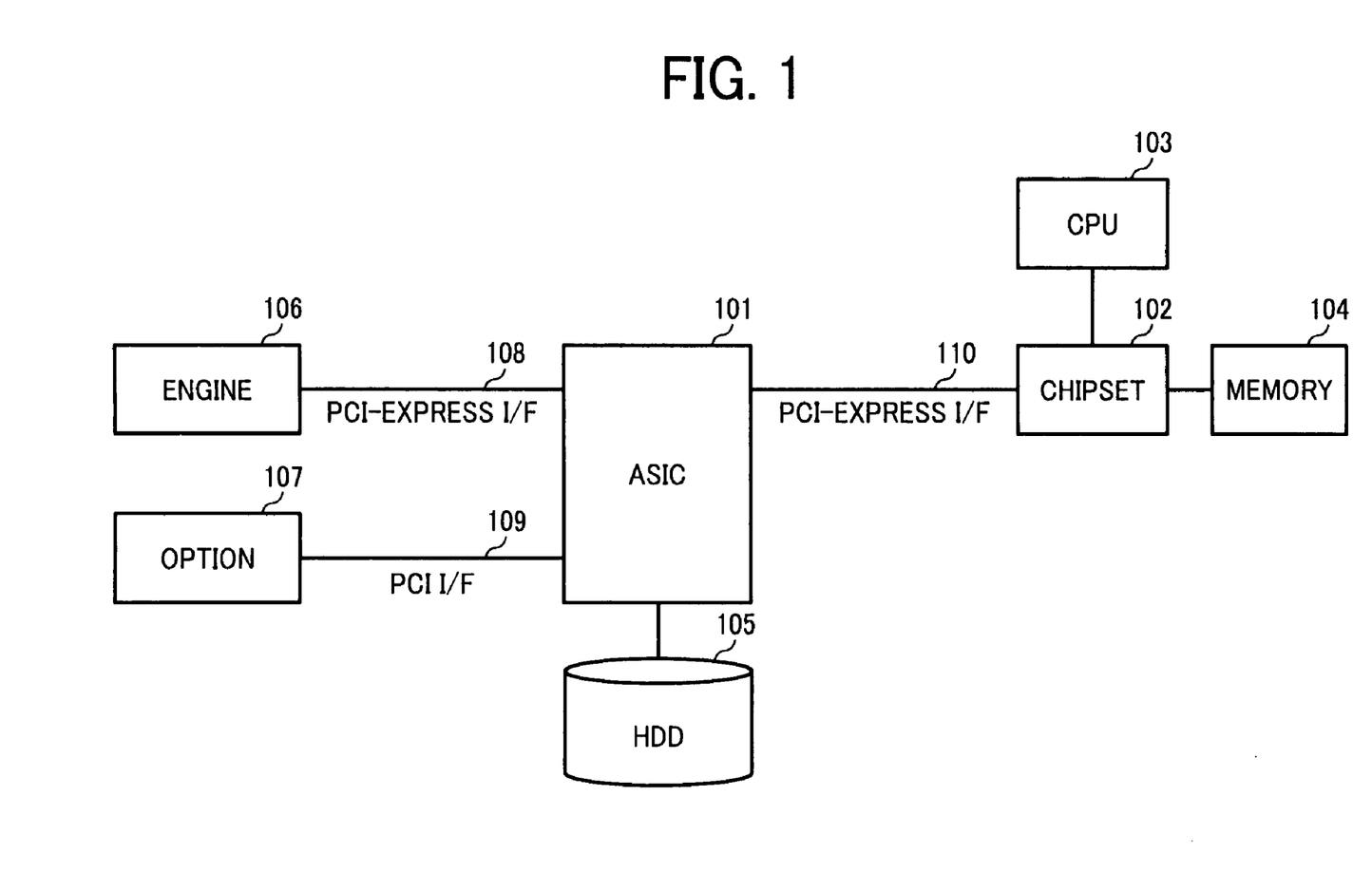
FIG. 1 is a block diagram of an image forming apparatus according to a first embodiment of the present invention.
Figure 2:
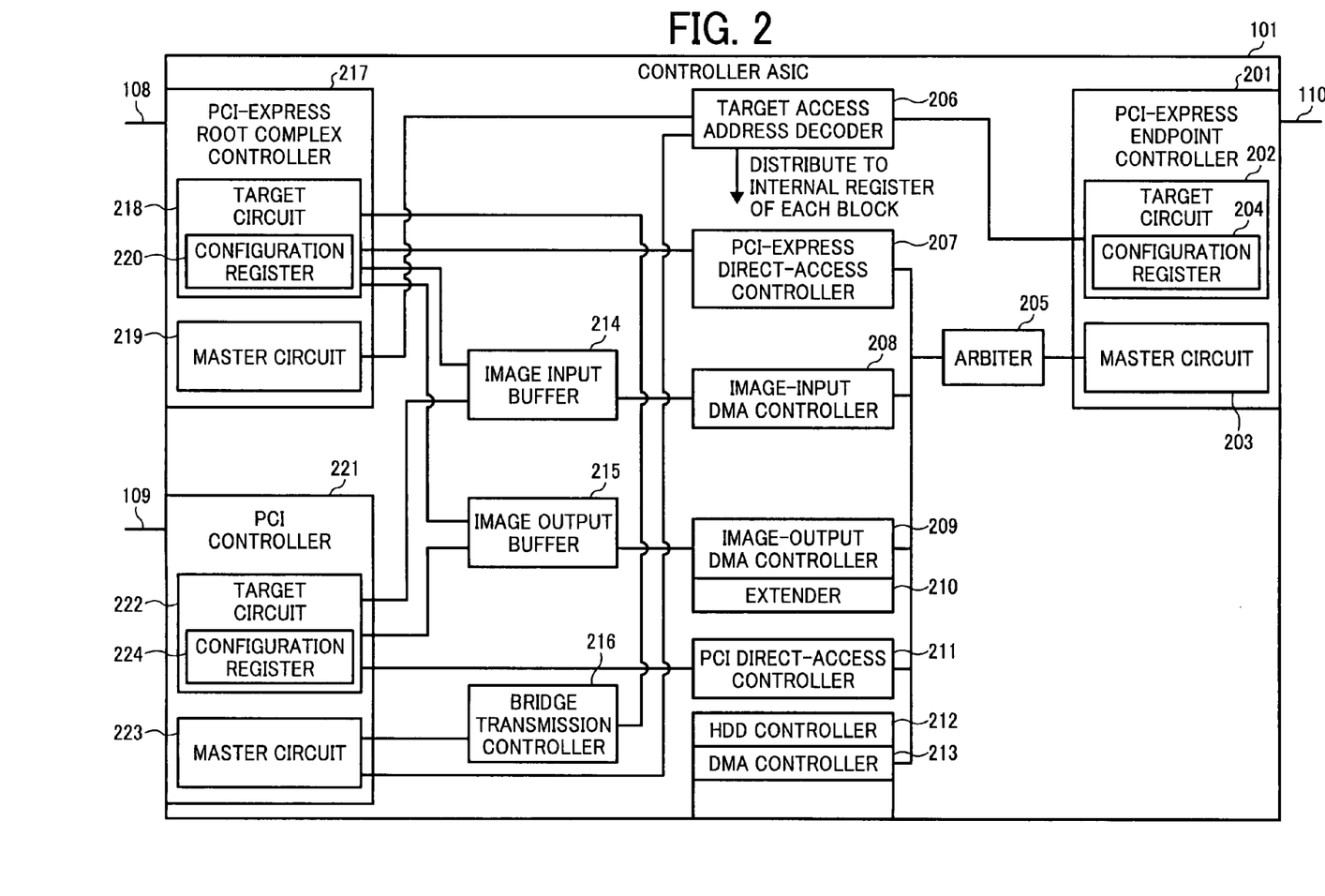
FIG. 2 is a block diagram of a controller ASIC shown in FIG. 1.
Figure 3:
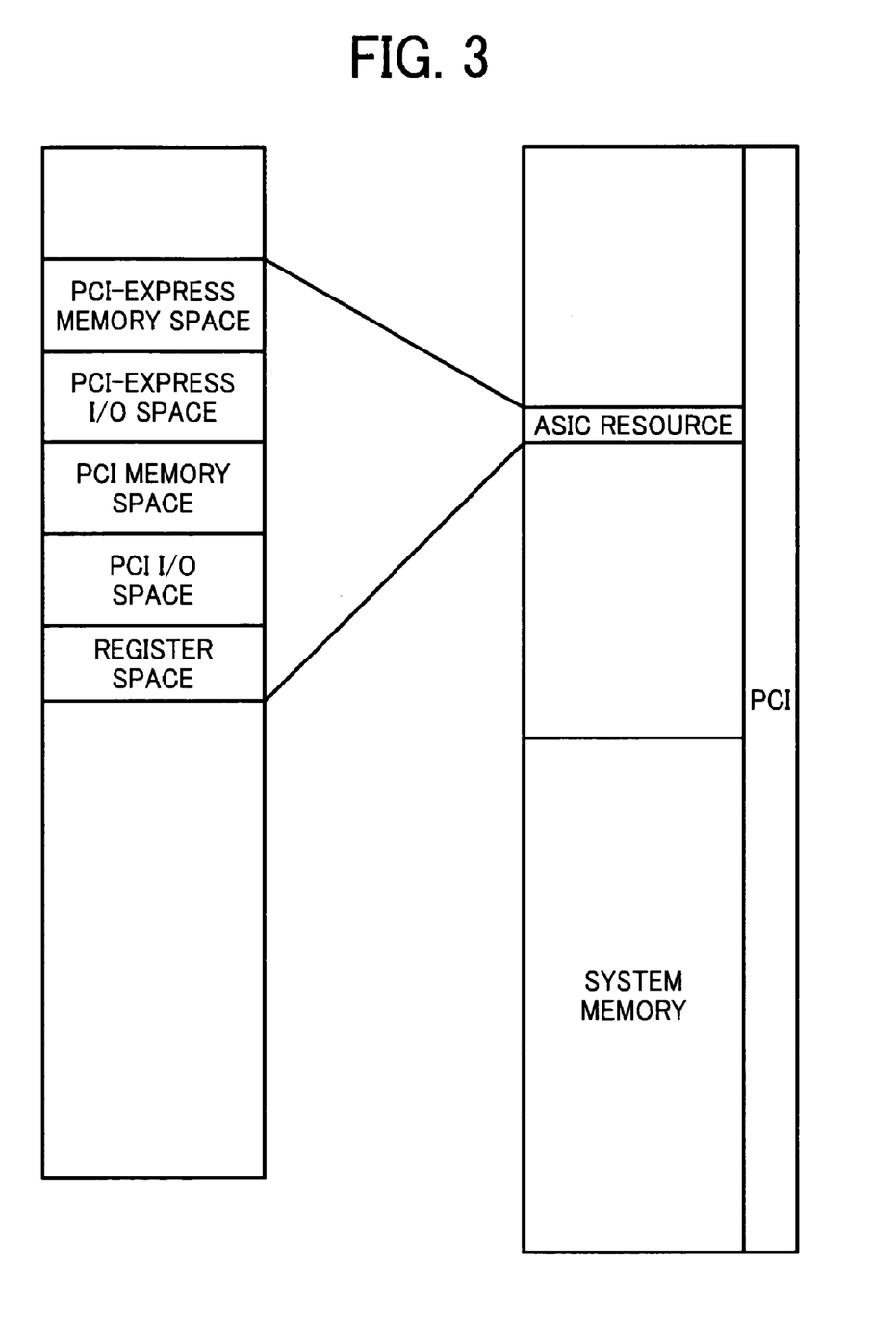
FIG. 3 is a schematic diagram for explaining a state where a register of the controller ASIC and resources of an engine and an option are mapped as memory spaces and I/O spaces of a PCI-EXPRESS and a PCI.
Figure 4:
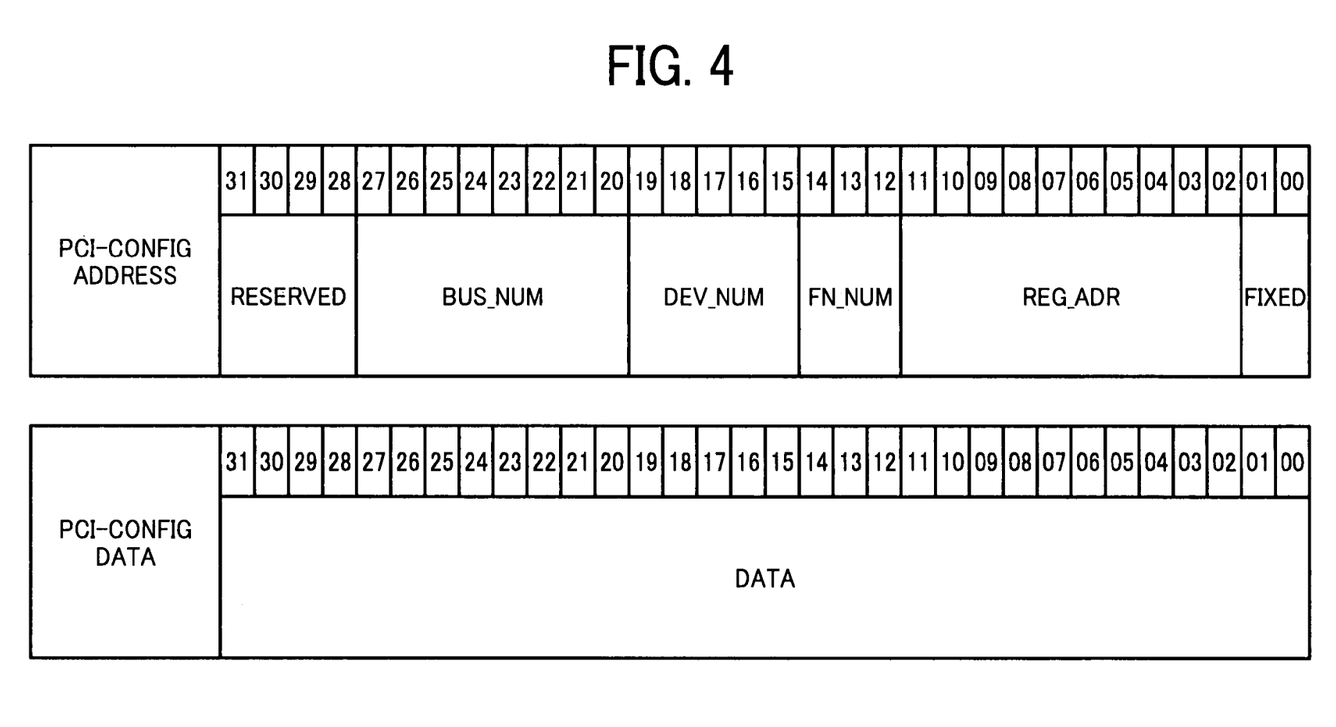
FIG. 4 is a schematic diagram for explaining contents of a dedicated register of the controller ASIC shown in FIG. 1.
Figure 5:
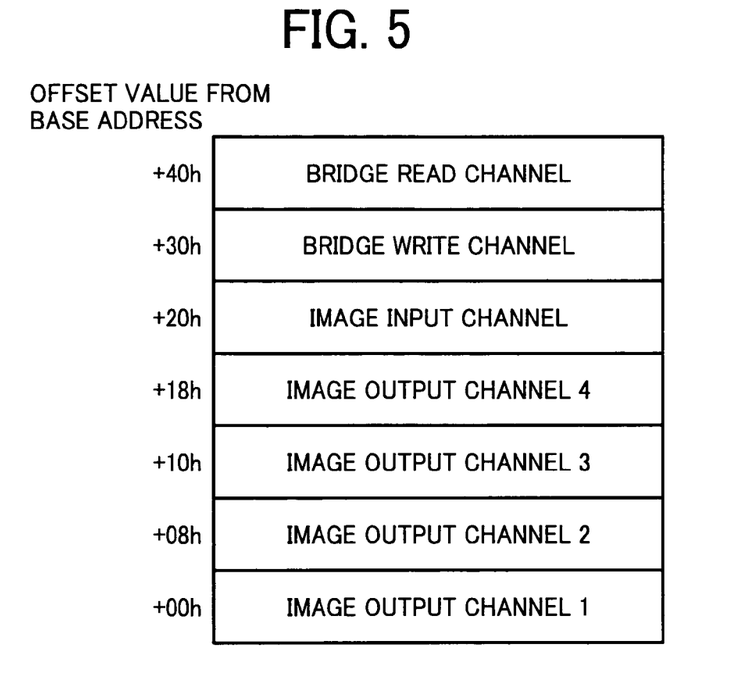
FIG. 5 is a schematic diagram for explaining an association between offset values from a base address of a PCI-EXPRESS root complex controller of the controller ASIC and resources.
Figure 6:
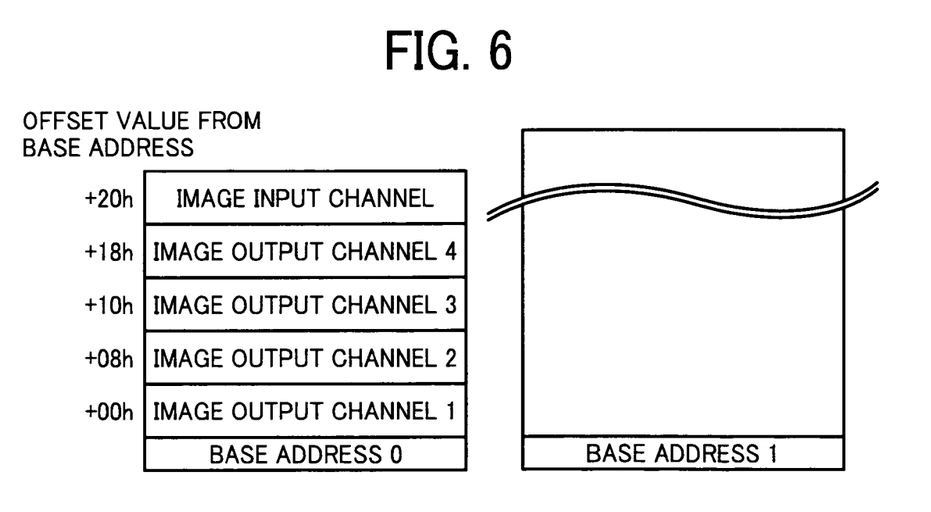
FIG. 6 is a schematic diagram for explaining an association between offset values from two base addresses of a PCI of the controller ASIC and resources.

FIG. 1 is a schematic diagram of an image forming apparatus according to a first embodiment of the present invention; FIG. 2 is a block diagram of a controller ASIC 101; FIG. 3 is a schematic diagram for explaining a state where a register of the controller ASIC 101 and resources of an engine and an option are mapped as memory spaces and input/output (I/O) spaces of PCI-EXPRESS and PCI; FIG. 4 is a schematic diagram for explaining contents of a dedicated register of the controller ASIC 101; FIG. 5 is a schematic diagram for explaining an association between offset values from a base address of a PCI-EXPRESS root complex controller 217 of the controller ASIC 101 and resources; and FIG. 6 is a schematic diagram for explaining an association between offset values from two base addresses of a PCI controller 221 of the controller ASIC 101 and resources.

As shown in FIG. 1, the controller ASIC 101 is connected to an engine 106 including a scanner and a plotter via a PCI-EXPRESS I/F 108 (hereinafter, "a PCI-EXPRESS 108"), an option 107 serving as an external I/F such as the IEEE 1394 via a PCII/F 109 (hereinafter, "a PCI 109"), a hard disk drive (HDD) 105, and a chipset 102 via a PCI-EXPRESS I/F 110 (hereinafter, "a PCI-EXPRESS 110"). The chipset 102 is connected to a CPU 103 and a memory 104.

As shown in FIG. 2, the controller ASIC 101 includes a PCI-EXPRESS endpoint controller 201 connected to the chipset 102 via the PCI-EXPRESS 110, the PCI-EXPRESS root complex controller 217 connected to the engine 106 via the PCI-EXPRESS 108, and the PCI controller 221 connected to the option 107 via the PCI 109.

The PCI-EXPRESS endpoint controller 201 includes a target circuit 202 having a configuration register 204, and a master circuit 203. The PCI-EXPRESS endpoint controller 201 receives, on behalf of the engine 106 and the option 107, an access from the CPU 103 connected to the chipset 102 to the engine 106 and the option 107 connected to the CPU 103 via the controller ASIC 101. Furthermore, the PCI-EXPRESS endpoint controller 201 inhibits a reference from the CPU 103 to a resource connected to the controller ASIC 101.

The master circuit 203 performs a data control with an external device (e.g., the chipset 102) connected to the master circuit 203 via a bus. Specifically, the master circuit 203 sends a request of data transmission to a target circuit of the external device and thereby the data transmission is performed.

The target circuit 202 includes the configuration register 204 and performs a control of receiving a request of data transmission from a master circuit of the external device (e.g., the chipset 102) and thereby the data transmission is performed. The configuration register 204 contains an address of an accessible device.

The PCI-EXPRESS root complex controller 217 includes a target circuit 218 having a configuration register 220, and a master circuit 219, similar to the controller 201. The PCI-EXPRESS root complex controller 217 transmits and receives image data to/from the engine 106 connected to the PCI-EXPRESS root complex controller 217 via the PCI-EXPRESS 108.

The PCI controller 221 includes a target circuit 222 having a configuration register 224, and a master circuit 223, similar to the controllers 201 and 217. The PCI controller 221 transmits and receives image data to/from the option 107 connected to the PCI controller 221 via the PCI 109.

The PCI-EXPRESS root complex controller 217 and the PCI controller 221 convert a memory access by the engine 106 and the option 107 into an access to the memory 104 connected to the chipset 102 and inhibit a reference from the engine 106 and the option 107 to an untargeted resource.

The PCI-EXPRESS endpoint controller 201 is controlled by the CPU 103 so that the PCI-EXPRESS endpoint controller 201 controls transmission and reception of image data by accessing the memory 104 via the chipset 102, controls transmission and reception of data and data transmission path between the PCI-EXPRESS root complex controller 217 and the PCI controller 221 in cooperation with the PCI-EXPRESS root complex controller 217 and the PCI controller 221, and controls the engine 106 and the option 107 connected to the PCI-EXPRESS root complex controller 217 and the PCI controller 221. Thus, processing of the image data is performed.

An image input buffer 214, an image output buffer 215, a bridge transmission controller 216, a target access address decoder 206, a PCI-EXPRESS direct-access controller 207, an image-input direct memory access (DMA) controller 208, an image-output DMA controller 209 having an extender 210, a PCI direct-access controller 211, an HDD controller 212, a DMA controller 213, and an arbiter 205 are arranged between the PCI-EXPRESS endpoint controller 201, the PCI-EXPRESS root complex controller 217, and the PCI controller 221 to control the data exchange and the data transmission path as described above.

An operation of the image forming apparatus according to the first embodiment is described below. The same operations are performed in image forming apparatuses of a second and a third embodiments of the present invention, and therefore the same explanations will not be repeated.

When the image forming apparatus shown in FIG. 1 is activated, a BIOS software (not shown) executes enumeration of a PCI device including a PCI-EXPRESS I/F. Specifically, the BIOS software reads a device vender identification (ID) register of the configuration register 220 in the PCI-EXPRESS root complex controller 217 and the configuration register 224 in the PCI controller 221 by assigning a bus number and a device number. If a read value is other than 0xffffffff, the BIOS software recognizes that a device is connected, i.e., the engine 106 is connected to the PCI-EXPRESS root complex controller 217 and the option 107 is connected to the PCI controller 221.

Resources (capacity of a memory space and an I/O space) are allocated to the option 107 that is a detected PCI device and the engine 106 that is a detected PCI-EXPRESS device, respectively. Specifically, capacity of the memory space and the I/O space necessary for the device are recognized based on base address registers of the configuration register 220 in the PCI-EXPRESS root complex controller 217 and the configuration register 224 in the PCI controller 221, so that the memory spaces are allocated from available memory spaces and addresses of allocated memory spaces are set to the base address registers. It is noted that a device can have a plurality of base address registers.

The controller ASIC 101 has a base address register, and a register of the controller ASIC 101 and resources of the engine 106 and the option 107 are mapped as the memory space and the I/O space of the PCI-EXPRESS and the PCT to a region of the base address register. The state of the mapping is shown in FIG. 3 in which a PCI-EXPRESS memory space, a PCI-EXPRESS I/O space, a PCI memory space, a PCI I/O space, and a register space are mapped to a memory region of an ASIC resource.

After settings of the controller ASIC 101 are completed by processing of activation of the image forming apparatus and detection and setting of the controller ASIC 101 as described above, settings of the PCI-EXPRESS 108 connected to the engine 106 and the PCI 109 connected to the option 107 are performed.

An access to the configuration register 220 in the PCI-EXPRESS root complex controller 217 connected to the engine 106 and an access to the configuration register 224 in the PCI controller 221 connected to the option 107 are run via a dedicated register of the controller ASIC 101 shown in FIG. 4.

As shown in FIG. 4, a bus number BUS_NUM, a device number DEV_NUM, a function number FN_NUM, and a register address REG_ADR are set to an address register (PCI-CONFIG ADDRESS). A configuration read access is run by reading a data register, and a configuration write access is run by writing to the data register.

By reading the configuration register 220 in the PCI-EXPRESS root complex controller 217 and the configuration register 224 in the PCI controller 221 in the above described manner, detection of a device and a resource allocation to the base address register are performed.

The PCI-EXPRESS root complex controller 217 in the controller ASIC 101 has a base address resource, and resources are allocated based on offset values from the base address resource as shown in FIG. 5. Specifically, an image output channel 1 is allocated to a region of +00h of the offset-value from the base address, an image output channel 2 to a region of +08h, an image output channel 3 to a region of +10h, an image output channel 4 to a region of +18h, an image input channel to a region of +20h, a bridge write channel to a region of +30h, and a bridge read channel to a region of +40h.

The PCI controller 221 of the controller ASIC 101 has two base addresses, and resources are allocated as shown in FIG. 6. Specifically, similar to resource allocation shown in FIG. 5, the image output channel 1 is allocated to the region of +00h of the offset value from the base address, the image output channel 2 to the region of +08h, the image output channel 3 to the region of +10h, and the image output channel 4 to the region of +18h, the image input channel to the region of +20h, for one of the base addresses.

The PCI-EXPRESS root complex controller 217 and the PCI controller 221 include fixed address resources for image input and image output, respectively. At this state, the engine 106 that needs an image input resource and an image output resource is connected to either one of the PCI-EXPRESS 108 and the PCI 109. Therefore, the controller ASIC 101 is notified by an external terminal whether the engine 106 is connected to the PCI-EXPRESS 108 or the PCI 109, so that an access to the image input resource and the image output resource is only allowed by the interface connected to the engine.

Processing of an image output via an image output path (including extension) is described below. It is assumed that an image and a code to be output are stored in the memory 104 connected to the chipset 102.

Software performs a register setting of the image-output DMA controller 209 upon starting to run. The image-output DMA controller 209 accesses the master circuit 203 of the PCI-EXPRESS endpoint controller 201 via the arbiter 205, generates a memory read transaction of the PCI-EXPRESS, and accesses the memory 104 that stores therein an image.

Data of the image read from the memory 104 is stored in the image output buffer 215. When the data of the image is encoded in the memory 104, the image output DMA controller 209 extends encoded data by using the extender 210 and stores extended data in the image output buffer 215.

The engine 106 that runs individually accesses image output resources of the target circuit 222 of the PCI controller 221 via the PCI 109 and the target circuit 218 of the PCI-EXPRESS root complex controller 217 via the PCI-EXPRESS 108.

Due to the access to the image output resources, data is retrieved from the image output buffer 215 and retrieved data is sent to the engine 106 as a response data.

Processing of an image input via a memory path is described below.

Software performs a register setting of the image-input DMA controller 208 upon starting to run. The image-input DMA controller 208 issues a write access to the image input resources of the PCI controller 221 and the PCI-EXPRESS root complex controller 217 to acquire data input by the engine 106 with a scanner, and sequentially stores data acquired by the write access to the image input resources in the image input buffer 214.

The image-input DMA controller 208 reads all data stored in the image input buffer 214, and writes the read data to a preset address (on a memory of the chipset 102).

Data writing to the memory 104 connected to the chipset 102 is performed by sending a request of data writing to the master circuit 203 of the PCI-EXPRESS endpoint controller 201 via the arbiter 205 and generating a PCI-EXPRESS transaction.

Processing of an access to a resource other than the image input resource and the image output resource from the engine 106 connected to the PCI-EXPRESS 108 is described below.

An access from the engine 106 connected to the PCI-EXPRESS 108 to the controller ASIC 101 and other than an access to the image input resource and the image output resource is considered as an access to the chipset 102. A PCI-EXPRESS transaction for the chipset 102 is generated as a master access from the PCI-EXPRESS endpoint controller 201 via the PCI-EXPRESS direct-access controller 207 and the arbiter 205, and thereby an access to the memory 104 connected to the chipset 102 is executed.

Processing of a direct memory access from the option 107 connected to the PCI 109 is described below.

An access from the option 107 connected to the PCI 109 to the controller ASIC 101 and to the resource of the direct memory access is considered as an access to the chipset 102. A PCI-EXPRESS transaction for the chipset 102 is generated as a master access from the PCI-EXPRESS endpoint controller 201 via the PCI direct-access controller 211 and the arbiter 205, and thereby an access to the memory 104 connected to the chipset 102 is executed.

The processing described above is performed in the same manner in the second and the third embodiments. On the other hand, according to the first embodiment, the engine 106 including a scanner and a plotter is connected to the controller ASIC 101 via the PCI-EXPRESS 108, and the option 107 as an external I/F such as the IEEE 1394 is connected to the controller ASIC 101 via the PCI 109. That is, the engine 106 is not connected to the controller ASIC. 101 via the PCI 109. Thus, because the PCI controller 221 of the controller ASIC 101 is not connected to the engine 106, an access request to the image input resource and the image output resource of the PCI 109 is rejected and a reference to the base address from the software is inhibited. Specifically, a response indicating that the base address register of the configuration register 224 of the PCI controller 221 is not implemented is returned.

Figure 7:
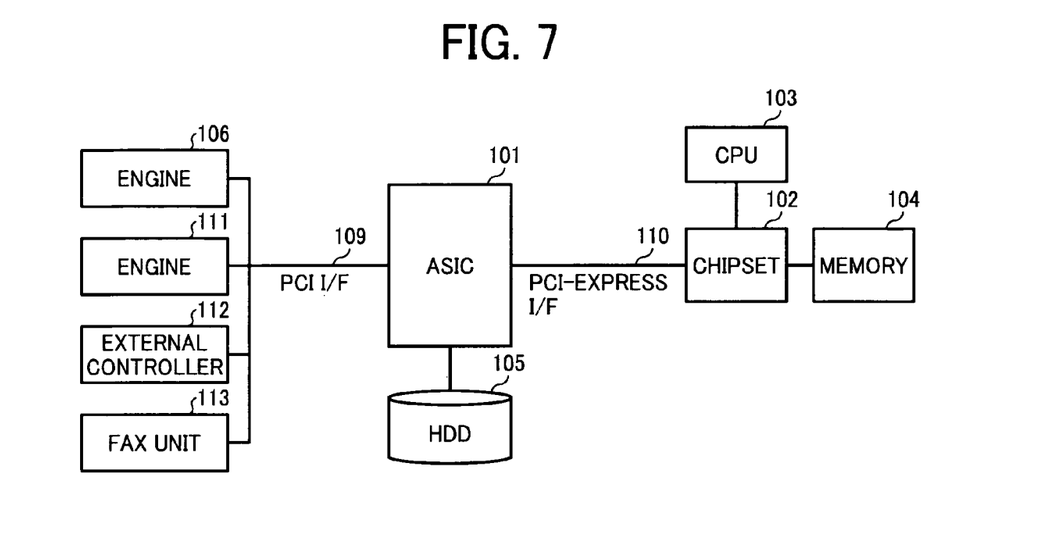
FIG. 7 is a block diagram of an image forming apparatus according to a second embodiment of the present invention.

FIG. 7 is a block diagram of an image forming apparatus according to a second embodiment of the present invention.

Two engines 106 and 111 including a scanner and a plotter, and options such as an external controller 112 and a facsimile (FAX) unit 13 are connected to the controller ASIC 101 via the PCI 109. Furthermore, the HDD 105 is connected to the controller ASIC 101 and the chipset 102 is connected to the controller ASIC 101 via the PCI-EXPRESS 110. The CPU 103 and the memory 104 are connected to the chipset 102. The configuration of the controller ASIC 101 shown in FIG. 7 is the same as that shown in FIG. 2.

The second embodiment is different from the first embodiment in that a device is not connected to the controller ASIC 101 via the PCI-EXPRESS 108 and the engines 106 and 111 including a scanner and a plotter and options such as the external controller 112 and a FAX unit 113 are connected to the controller ASIC 101 via the PCI 109. That is, because the PCI-EXPRESS root complex controller 217 of the controller ASIC 101 is not connected to a device, an access request to the image input resource and the image output resource of the PCI-EXPRESS 108 is rejected and a reference to the corresponding base address from the software is inhibited. Specifically, a response indicating that the base address register of the configuration register 220 of the PCI-EXPRESS root complex controller 217 is not implemented is returned.

Figure 8:
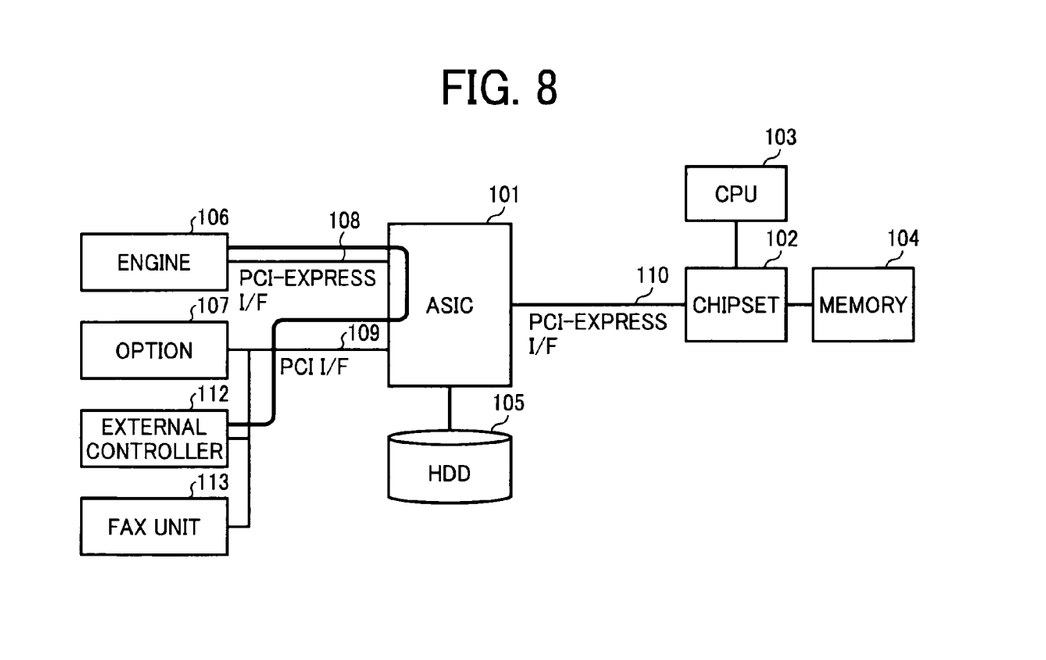
FIG. 8 is a block diagram of an image forming apparatus according to a third embodiment of the present invention.

FIG. 8 is a block diagram of an image forming apparatus according to a third embodiment of the present invention. The engine 106 is connected to the controller ASIC 101 via the PCI-EXPRESS 108, and the option 107, the external controller 112, and the FAX unit 113 are connected to the controller ASIC 101 via the PCI 109. Furthermore, the HDD 105 is connected to the controller ASIC 101 and the chipset is connected to the controller ASIC 101 via the PCI-EXPRESS 110. The CPU 103 and the memory 104 are connected to the chipset 102. The CPU 103 and the memory 104 are connected to the chipset 102. The configuration of the controller ASIC 101 shown in FIG. 8 is the same as that shown in FIG. 2.

Processing of image transmission from the engine 106 to the external controller 112 is described below.

The base address of the PCI-EXPRESS root complex controller 217 includes a resource having a fixed address for a bridge transmission for transmitting data of an image from the engine 106 to the external controller 112. The bridge transmission controller 216 includes an address converting unit that converts a destination address of an access from the fixed address into an address of a resource of the external controller 112.

The address converting unit includes an address conversion register configurable by the software, and converts a fixed address accessed from the PCI-EXPRESS 108 into a fixed address set in the address conversion register. The master circuit 223 of the PCI controller 221 generates a PCI transaction using a converted fixed address, and runs an access to the external controller 112 connected to the PCI 109. Thus, the data of the image can be transmitted from the engine 106 to the external controller 112 via the bridge transmission controller 216.

The controller ASIC 101 can transfer the access to the resource to an appropriate destination. Therefore, the resources connected to the PCI 109 and the PCI-EXPRESS 108 are accessed only by a device that needs the resources. Furthermore, the controller ASIC 101 can appropriately switch the resources for image transmission from one to the other depending on whether the engine is connected to the PCI-EXPRESS 108 or the PCI 109. Moreover, the controller ASIC 101 can transmit the data of the image from the PCI-EXPRESS 108 to the PCI 109 within a limited resources in an easy manner.

Figure 9:
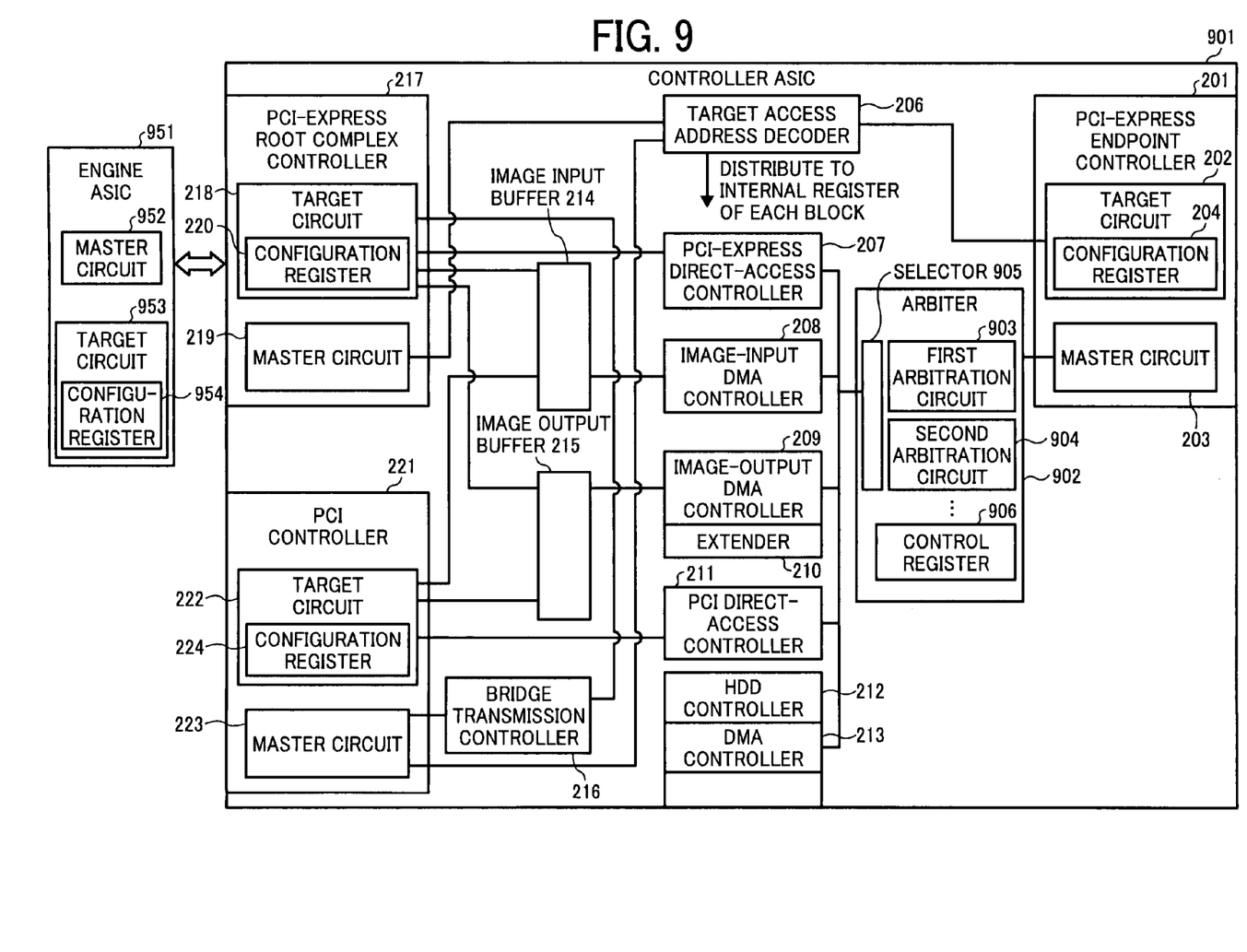
FIG. 9 is a block diagram of an image forming apparatus according to a fourth embodiment of the present invention.

FIG. 9 is a block diagram of a controller ASIC 901 and an engine ASIC 951 according to a fourth embodiment of the present invention. The controller ASIC 901 includes an arbiter 902 that performs processing different from that performed by the arbiter 205. The same reference numerals are assigned to the same components described in the first embodiment, and therefore the same explanations are not repeated.

The engine ASIC 951 includes a master circuit 952 and a target circuit 953, and is connected to the PCI-EXPRESS root complex controller 217 via the PCI-EXPRESS 108. The engine ASIC 951 includes functions as a scanner that acquires image data and a plotter that prints the image data onto a recording sheet.

The master circuit 952 controls data transmission with the controller ASIC 901 connected to the engine ASIC 951 via a bus. Specifically, the master circuit 203 sends a data transmission request to the target circuit 218 of the controller ASIC 901, and thereby the data transmission is performed.

The target circuit 953 includes a configuration register 954, receives the data transmission request from the master circuit of the controller ASIC 901, and performs a control of the data transmission. The configuration register 204 contains an address of a device accessible by the controller ASIC 901.

The engine ASIC 951 is connected to the PCI-EXPRESS root complex controller 217 via a PCI-EXPRESS bus.

The PCI-EXPRESS bus can change a bandwidth by changing the number of lanes, so that its performance can be changed in a scalable manner. For example, assuming that the controller ASIC 901 is installed in each of different image forming apparatuses, if the controller ASIC 901 is configured to use 16 lanes for transmitting a high-quality color image at a high transmission speed and use one lane for transmitting a monochrome image at a low transmission speed, data transmission can be performed with appropriate performance for each image forming apparatus. Furthermore, it is possible to reduce power consumption and simplify a substrate wiring by not connecting an unnecessary lane when the controller ASIC 901 is installed.

The image forming apparatus performs various processing on data such as image data from the engine ASIC, FAX data, and communication data regardless of the level of the performance of the image forming apparatus. However, in a conventional image forming apparatus, a plurality of data transmission functions are arbitrated in a controller ASIC so that an image transmission with the engine (scanner input and plotter output) is prioritized over other functions at any time without considering the level of the performance.

At this state, if the PCI-EXPRESS bus uses only one lane providing a narrow bandwidth, it is preferable to perform an arbitration in a manner as described above. On the other hand, if the PCI-EXPRESS bus uses 16 lanes providing a wide bandwidth, it is preferable to perform an arbitration so that a predetermined bandwidth is assured for a transmission function with a midlevel priority to attain an optimal performance. Thus, the arbiter 902 of the controller ASIC 901 is configured as described below to attain the optimal performance.

The arbiter 902 includes a control register 906, a selector 905, and a plurality of arbitration circuits including a first arbitration circuit 903 and a second arbitration circuit 904, and performs an arbitration using different arbitration algorithm depending on situations.

The first arbitration circuit 903 performs an arbitration so that a scanner/plotter transmission is most prioritized and other image processing transmission is least prioritized. The arbitration performed by the first arbitration circuit 903 is referred to as an engine priority type.

An image output function by the engine ASIC 951 cannot be stopped when writing processing by the engine ASIC 951 is started. Thus, in the engine priority type arbitration, an image transmission from the engine ASIC 951 is executed with the highest priority even when other data transmission function is being performed.

The second arbitration circuit 904 performs an arbitration so that a wide bandwidth is ensured for a transmission with a high priority such as the scanner/plotter transmission, a predetermined bandwidth narrower than that for the scanner/plotter transmission is ensured for a transmission with a midlevel priority such as a transmission with an HDD controller, and a transmission other than the transmissions with the high priority and the midlevel priority is least prioritized. The arbitration performed by the second arbitration circuit 904 is referred to as a bandwidth ensured type.

For example, if the number of the lanes of the PCI-EXPRESS bus is substantial providing a substantial bandwidth, the scanner/plotter transmission does not delay even if a predetermined bandwidth is allocated to a transmission function other than the image output transmission. Therefore, the second arbitration circuit 904 performs the bandwidth ensured type arbitration on assumption of the above situation.

The number of the arbitration circuits is not limited to two; three or more of the arbitration circuits can be used. A configuration for controlling a switching between the first arbitration circuit 903 and the second arbitration circuit 904 is described below.

The control register 906 contains information for switching the first arbitration circuit 903 and the second arbitration circuit 904.

Figure 10:
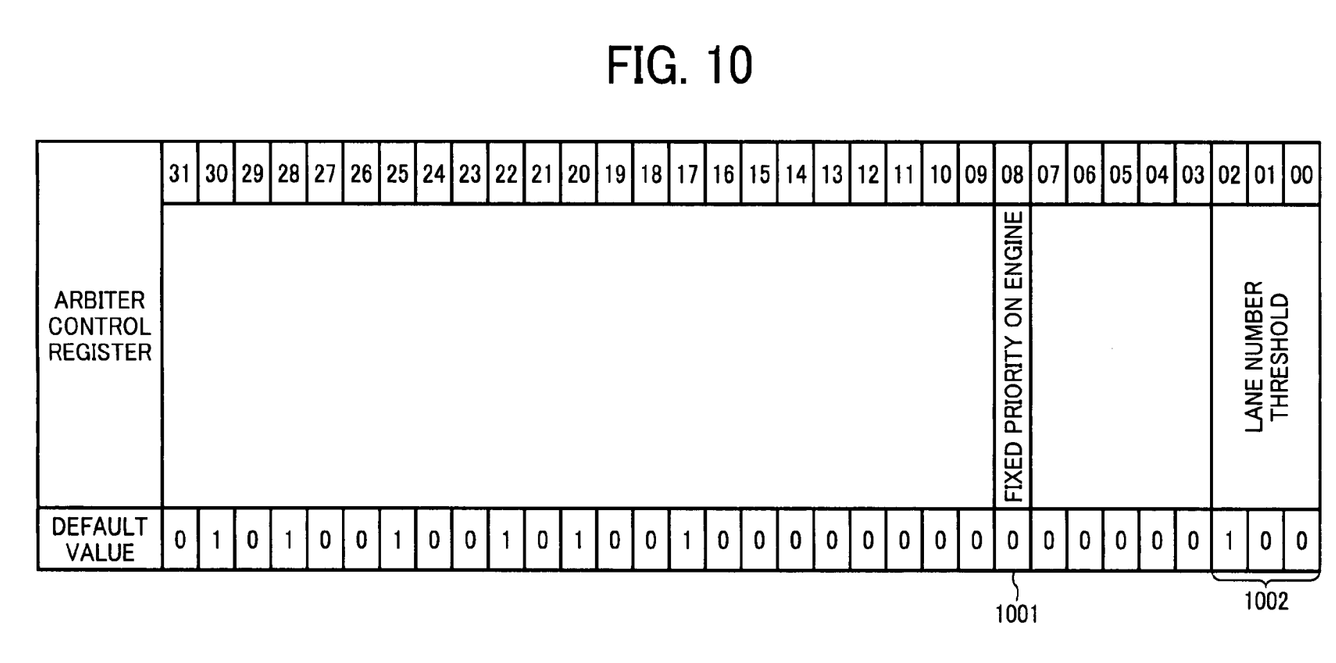
FIG. 10 is a schematic diagram of a data structure of a control register of an arbiter shown in FIG. 9.

FIG. 10 is a schematic diagram of a data structure of the control register 906 in the arbiter 902. A reference numeral 1002 is assigned to bits 00 to 02 containing a threshold of the number of the lanes for switching the engine priority type and the bandwidth ensured type. If the number of the actual lanes is smaller than the threshold set in the bits 00 to 02, the engine priority type arbitration is performed. On the other hand, if the number of the actual lanes is equal to or larger than the threshold set in the bits 00 to 02, the bandwidth ensured type arbitration is performed.

A reference numeral 1001 is assigned to a bit 08 containing a setting of a fixed highest priority on engine. If the default value of the bit 08 is set to "1", the engine priority type arbitration is performed regardless of the number of the lanes.

Referring back to FIG. 9, the selector 905 refers to the control register 906 and selects either one of the first arbitration circuit 903 and the second arbitration circuit 904 as a circuit for actually performing the arbitration depending on the number of the lanes set in the PCI-EXPRESS bus. The number of the lanes set in the PCI-EXPRESS bus is detected by checking a link width for a target device by the PCI-EXPRESS root complex controller 217 before link training. The detected number of the lanes is input to the arbiter 902.

It is assumed that the threshold of the number of the lanes is set to "8" in the control register 906. Therefore, the selector 905 determines whether the input number of the lanes is equal to or larger than "8". If it is determined that the number of the lanes is equal to or larger than "8", the selector 905 selects the second arbitration circuit 904 as an actual circuit for the arbitration. On the other hand, if it is determined that the number of the lanes is smaller than "8", the selector 905 selects the first arbitration circuit 903 as an actual circuit for the arbitration.

An engine image output and an engine image input are exclusively performed in a general processing. However, if the bandwidth is not fully used, the engine image output and the engine image input can be performed simultaneously. Thus, the performance of the image forming apparatus can be enhanced. To perform such processing, a circuit for the engine priority type arbitration needs to be selected even when the number of the lanes exceeds the threshold, and the priority levels of the engine image output and the engine image input needs to be set to the same as the algorithm of the arbitration. As a result, input/output processing can be performed simultaneously with the highest priority.

According to the fourth embodiment, the algorithm of the arbitration of the data transmission function in the controller ASIC 901 can be changed depending on the number of the lanes between the controller ASIC 901 and the engine ASIC 951. Therefore, the controller ASIC 901 can execute the optimal arbitration control of the data transmission function depending on the number of the lanes of the PCI-EXPRESS (i.e., the processing capacity). As a result, the controller ASIC 901 and the image forming apparatus including the controller ASIC 901 can attain an appropriate processing performance.

Figure 11:
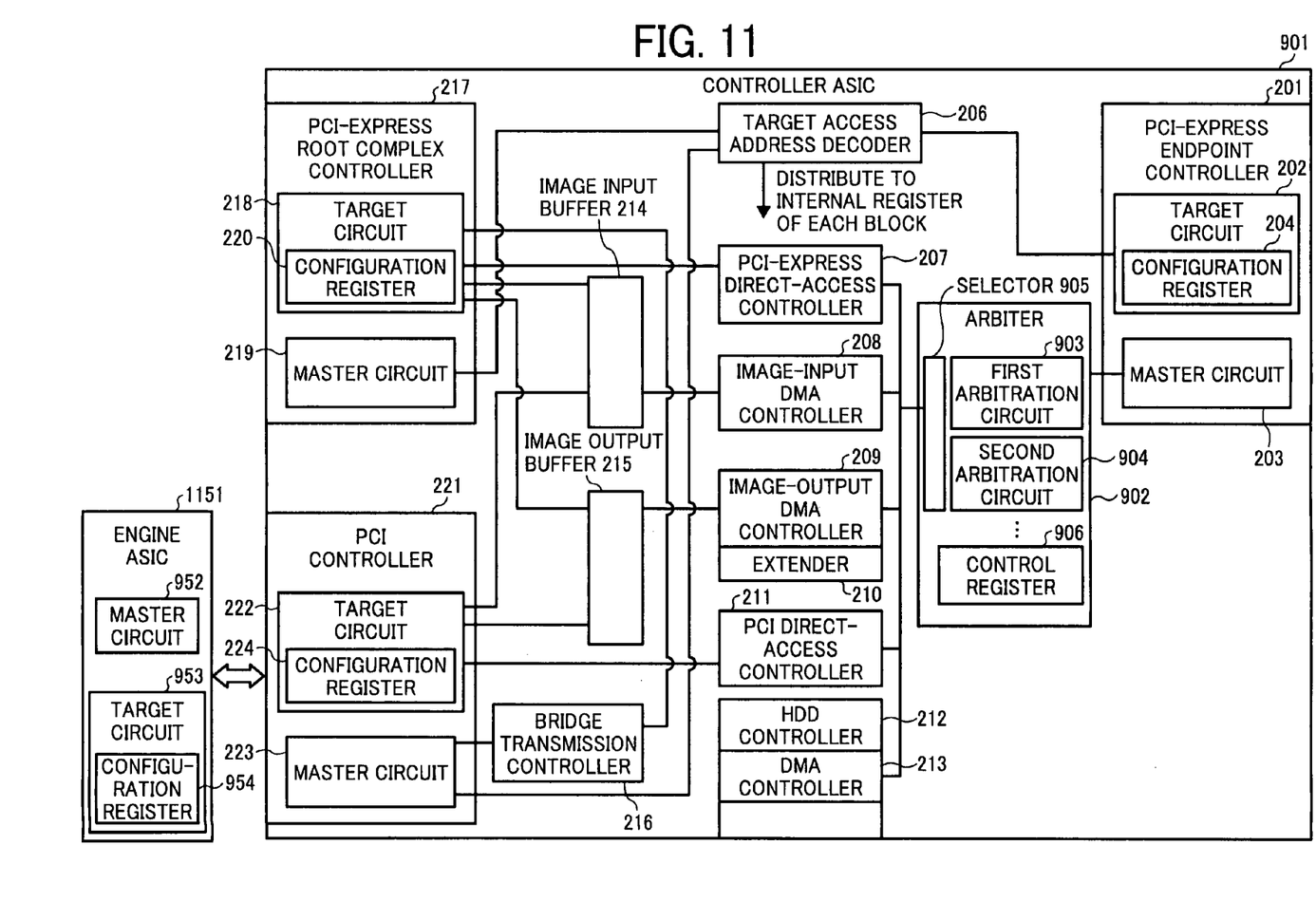
FIG. 11 is a block diagram of an image forming apparatus according to a fifth embodiment of the present invention.

FIG. 11 is a block diagram of the controller ASIC 901 and an engine ASIC 1151 according to a fifth embodiment of the present invention. The controller ASIC 901 is the same as that shown in FIG. 9. The fifth embodiment is different from the fourth embodiment in that the engine ASIC 1151 is connected to the PCI controller 221 via a PCI bus. The same reference numerals are assigned to the same components described in the first embodiment, and the same explanations are not repeated.

The engine ASIC 1151 is configured to perform processing at a processing speed lower than that of the engine ASIC 951.

The PCI-EXPRESS root complex controller 217 checks a link width with an opposing device before link training. When it is checked that the link width is "0", that is, connection is not found, the controller ASIC 901 considers that the engine ASIC 1151 is connected to the PCI. Then, the controller ASIC 901 inputs to the arbiter 205 information indicating that the engine ASIC 1151 is set to the PCI.

In this case, the selector 905 in the arbiter 902 selects the first arbitration circuit 903 as an actual circuit for the arbitration regardless of the number of the lanes.

According to the fourth and the fifth embodiments, the algorithm of the arbitration of the data transmission function in the controller ASIC 901 can be changed depending on a destination to which the engine ASICs 951 and 1151 are connected. Therefore, the controller ASIC 901 can execute the optimal arbitration control of the data transmission function depending on the interface for connecting the engines ASIC 951 and 1151. As a result, the controller ASIC 901 and the image forming apparatus including the controller ASIC 901 can attain an appropriate processing performance.

As described above, according to an aspect of the present invention, both the PCI I/F and the PCI-EXPRESS I/F can be installed in the image forming apparatus. Therefore, scalability can be enhanced and a data transmission path that uses the PCI I/F and the PCI-EXPRESS I/F can be controlled.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing controller that performs transmission and processing of image data by connecting an engine, including a scanner and a plotter, and a central processing unit that is connected via a chipset, the image processing controller comprising:

a first controller to control communication with the chipset via a first PCI-Express interface;

a second controller, operatively connected to the first controller, to control in cooperation with the first controller, communication with the engine when the engine is connected via a second PCI-Express interface, the second controller including a first image input/output resource; and a third controller, operatively connected to the first controller to control, in cooperation with the first controller, communication with at least one of the engine and an external device when the at least one of the engine and the external device is connected via a PCI interface, the third controller including a second input/output resource;

wherein the first controller is configured to receive, on behalf of the engine and the external device, an access from the central processing unit to the engine and the external device, and is configured to inhibit a reference from the central processing unit to a resource operatively connected to the image processing controller, the image processing controller configured to detect whether the engine is connected to the second or third controller, to reject an access request from the second PCI-Express interface to the first input/output resource of the second controller when the second controller is not connected to the engine, and to reject an access request from the PCI interface unit to the second input/output resource of the third controller when the third controller is not connected to the engine, wherein when the second controller receives an access request from the engine to a memory connected to the chipset, the second controller converts a memory access from the engine into an access to the memory and inhibits a reference by the engine to the first image input/output resource, and when the third controller receives an access request from at least one of the engine and the external device to the memory connected to the chipset, the third controller converts a memory access from the at least one of the engine and the external device into an access to the memory and inhibits a reference by the at least one of the engine and the external device to the second image input/output resource.

2. The image processing controller according to claim 1, wherein the engine includes a target control unit to switch a visibility of the engine depending on whether the engine is connected to the second controller or the third controller.

3. The image processing controller according to claim 1, further comprising:

a bridging unit to bridge an address from the second controller to the third controller via a resource having a fixed address.

4. The image processing controller according to claim 1, further comprising:

a plurality of arbiter control units each to perform an arbitration processing using a different algorithm; and a selecting unit to select at least one the plurality of arbiter control units based on a number of lanes between the second controller and the engine.

5. The image processing controller according to claim 4, wherein the selecting unit is configured to select a predetermined one of the plurality of arbiter control units regardless of the number of lanes when the engine is connected to the third controller.

6. The image processing controller according to claim 1, wherein the third controller is configured to convert a memory access from the option into an access to a memory operatively connected to the chipset, and is configured to inhibit a reference by the external device to an unnecessary resource.

7. An image forming apparatus comprising an image processing controller that performs transmission and processing of image data by connecting an engine, including a scanner and a plotter, and a central processing unit that is connected via a chipset, wherein the image processing controller includes:

a first controller to control communication with the chipset via a first PCI-Express interface;

a second controller, operatively connected to the first controller, to control, in cooperation with the first controller, communication with the engine when the engine is connected via a second PCI-Express interface, the second controller including a first image input/output resource; and a third controller, operatively connected to the first controller, to control, in cooperation with the first controller, communication with at least one of the engine and an external device when the at least one of the engine and the external device is connected via a PCI interface, the third controller including a second input/out resource; and the first controller is configured to receive on behalf of the engine and the external device, an access from the central processing unit to the engine and the external device, and is configured to inhibit a reference from the central processing unit to a resource operatively connected to the image processing controller, wherein the image processing controller is configured to detect whether the engine is connected to the second or third controller, to reject an access request from the second PCI-Express interface to the first image input/output resource of the second controller when the second controller is not connected to the engine, and to reject an access request from the PCI interface to the second image input/output resource connected to the third controller when the third controller is not connected to the engine, wherein when the second controller receives an access request from the engine to a memory connected to the chipset, the second controller converts a memory access from the engine into an access to the memory and inhibits a reference by the engine to the first image input/output source, and when the third controller receives an access request from at least one of the engine and the external device to the memory connected to the chipset, the third controller converts a memory access from the at least one of the engine and the external device into an access to the memory and inhibits a reference by the at least one of the engine and the external device to the second input/output resource.

8. The image forming apparatus according to claim 7, wherein the image processing controller further includes:

a plurality of arbiter control units each to perform an arbitration processing using a different algorithm; and a selecting unit to select at least one of the arbiter control units based on number of lanes between the second controller and the engine.

9. The image forming apparatus according to claim 7, wherein the second controller and the third controller are configured to convert a memory access from the engine into an access to a memory operatively connected to the chipset, and are configured to inhibit a reference by the engine to an unnecessary resource.

10. The image forming apparatus according to claim 7, wherein the second controller is configured to convert a memory access from the engine into an access to a memory operatively connected to the chipset, and the second controller is configured to inhibit a reference by the engine to an unnecessary resource.

11. The image forming apparatus according to claim 7, wherein the third controller is configured to convert a memory access from the engine into an access to a memory operatively connected to the chipset, and the third controller is configured to inhibit a reference by the engine to an unnecessary resource.

12. The image forming apparatus according to claim 7, wherein the third controller is configured to convert a memory access from the option into an access to a memory operatively connected to the chipset, and the third controller is configured to inhibit a reference by the external device to an unnecessary resource.

\* \* \* \* \*